UNITED STATES PATENT OFFICE.

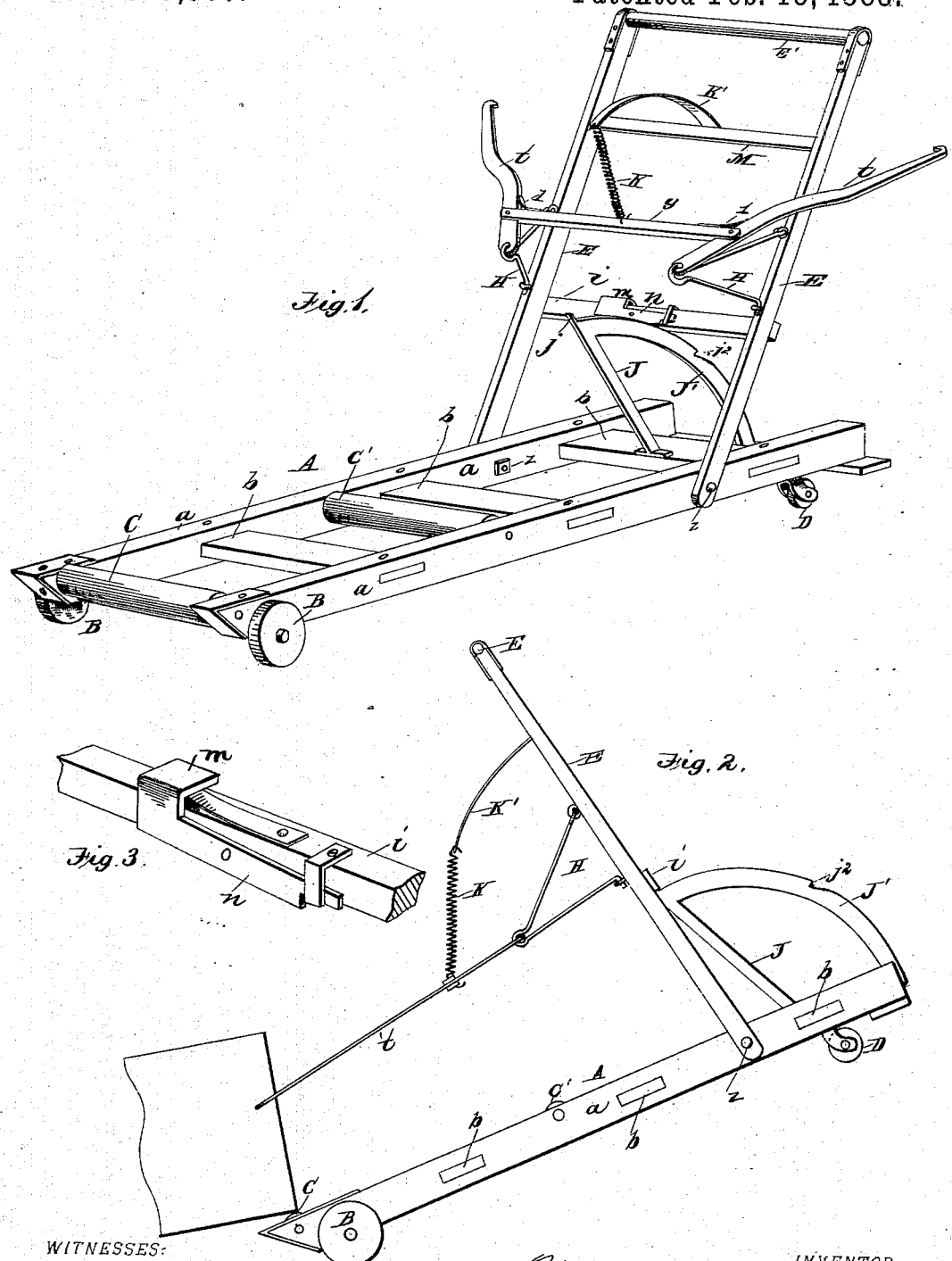

THOMAS A. WATROUS, OF WELLSBOROUGH, PENNSYLVANIA.

HAND-TRUCK.

SPECIFICATION forming part of Letters Patent No. 272,106, dated February 13, 1883.

Application filed July 20, 1882. (No model.)

*To all whom it may concern:*

Be it known that I, THOMAS A. WATROUS, of Wellsborough, in the county of Tioga and State of Pennsylvania, have invented certain new and useful Improvements in Hand-Trucks; and I do hereby declare the following to be a full, clear, and exact description of the same, reference being had to the accompanying drawings, forming part of this specification, in which—

Figure 1 is a perspective view of my improved truck. Fig. 2 is a side elevation of the same, showing the manner in which the box is grasped and drawn upon the truck. Fig. 3 is a detail view, showing the means for locking the lever or handle of the truck in position.

Similar letters of reference in the several figures denote the same parts.

My invention has for its object to provide an improved hand-truck for loading and moving freight, and especially that contained in boxes, bales, or like packages; and it consists in certain novel combinations of parts entering into the construction of the truck, which I will now proceed to describe, and then point out particularly in the claims at the end of the specification.

Referring to the drawings, A represents the bed of a truck, consisting of the longitudinal pieces $a$ and the cross-pieces $b$, secured firmly together in any suitable manner. The forward portion of this bed is supported by wheels B B, mounted on a suitable iron axle, while its rear end is supported upon caster-wheels D D, as shown.

C C' are rollers extending transversely across the bed and mounted so as to rotate freely upon their bearings, the roller C being located near the forward end of the bed and projecting slightly above the level thereof, and the roller C' near the middle of the bed.

E E are levers or handles pivoted to the bed at the points $z\ z$, and preferably connected at their upper ends by a cross-piece or handle proper, E'. A cross-bar, $i$, extends between and is bolted to the levers E E near their lower ends, and carries a spring-latch, $n$. This latch has a flange, $m$, which projects over the top of the cross-bar, $i$, and beneath it is arranged a suitable spring, whose function is to act upon the latch and keep its engaging end depressed.

Secured to the bed of the truck is an iron bar, J, which has a curved portion, J', against which the catch $n$ is held in contact by means of its spring. At the forward end of the curved portion J' a shoulder, $j$, is formed, with which the catch is adapted to engage when the levers E E are thrown forward to their fullest extent. A notch, $j^2$, is formed in the bar J', near its middle, and into this notch the spring-latch $n$ is forced when the levers E E are placed in the position which they occupy when used as handles for propelling the truck.

$t\ t$ are bent steel grasping-arms, articulated to the ends of a cross-bar, $g$, and terminating in hooks at their outer ends, as shown. The inner ends of these hook-arms are connected to hinges H H, mounted on the levers E E, and adapted to swing inward and outward, as shown in Figs. 1 and 2. Small springs $l\ l$, mounted upon the bar $g$, operate to throw outward the outer hooked ends of the grasping-arms, and a spring composed of a spiral portion, K, and leaf portion K'—the former connected to the bar $g$ and the latter to a cross-bar, M, extending between the handles E E—operates to raise the bar $g$ and fold the hook-arms $t\ t$ up against the levers E E, as shown in Fig. 1.

The normal position of the parts of the truck is represented in Fig. 1.

When it is desired to move a box or bale by means of the truck the latter is moved up to the same, the rear end of the truck being elevated until the forward end or pointed bed-rails rest on the floor close to the box or bale, as shown in Fig. 2. When in this position the levers and grasping-arms are allowed to drop forward until the hooked ends of the latter pass upon opposite sides of the box or bale. Then, with one hand forcing the cross-bar $g$ forward, while with the other hand the levers E E are drawn backward, the hooked ends of the grasping-arms are caused to embed themselves in the sides of the box or bale. The operator then, by drawing the levers E E toward him, gradually draws the box or bale upon the truck, the rollers C C assisting in rendering this operation easy. At the same time the rear end of the truck descends to its normal position and the forward end rolls under the box or bale. In the backward movement of the levers E E the spring-catch $n$ does not engage with the notch or shoulder $j^2$ in the curved part J' of the bar J, but slides past the same; but after the levers have reached their lowest point and the box is fully drawn upon the truck the levers are moved forward again to their normal position, thus causing the small springs l l to throw outward the hooked ends of the arms t t and disengage them from the sides of the box, and enable the spring K to draw upon the cross-bar g, swing inward the hinges H H, and fold the arms t t against the handles, as at the start. As the handles are lifted into their normal position the catch n engages with notch in the bar J' and locks the levers rigidly in position, so that they can be employed as handles in propelling the truck from place to place.

My improved truck is especially useful in handling boxes or other packages which, from the nature of their contents, do not admit of inversion, and also in handling boxes unprovided with covers without spilling their contents. The provision of the caster-wheels upon the rear end of the truck permits the truck to be readily and quickly turned within a comparatively small space.

It should be here stated that the flange m of the catch n is located in such position that the operator by pressing upon it with his foot can readily disengage the catch, so as to permit the levers to be swung on their pivots.

Having thus described my invention, I claim as new—

1. The combination, with the bed of the truck, of the pivoted levers E E, the grasping-arms having the hooked ends, the bar g, and hinges H H, whereby the hook-arms are enabled to be extended to grasp the load or to be folded up against the levers out of the way.

2. The combination, with the grasping hook-arms t t, the cross-bar g, and hinges H H, of the springs l l, operating to throw the hooks of the arms outward, substantially as described.

3. The combination of the pivoted levers, the hinges connected thereto, the cross-bar g, and hooks t t, with the springs K K' for automatically folding the arms against the levers, substantially as described.

4. The combination, with the truck-bed, of the pivoted levers, the load-grasping devices connected thereto, and the means for limiting the forward motion of the levers, substantially as described.

5. The combination, with the truck-bed, of the pivoted levers, the load-grasping devices connected thereto, and the catch and notched bar for locking the levers when used for propelling the truck, substantially as described.

6. The combination of the truck, having the transverse rollers C C', with the pivoted levers, the hinges, the grasping-arms, and the bar g, substantially as described.

T. A. WATROUS.

Witnesses:
HENRY C. COX,
E. A. BRYDEN.